(12) United States Patent
Ryan

(10) Patent No.: US 12,404,957 B2
(45) Date of Patent: *Sep. 2, 2025

(54) PIPE COUPLING

(71) Applicant: Robert D. Ryan, Santa Margarita, CA (US)

(72) Inventor: Robert D. Ryan, Santa Margarita, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/676,731

(22) Filed: May 29, 2024

(65) Prior Publication Data

US 2024/0309978 A1    Sep. 19, 2024

Related U.S. Application Data

(63) Continuation of application No. 18/191,335, filed on Mar. 28, 2023, now Pat. No. 12,031,648, which is a continuation of application No. 17/318,856, filed on May 12, 2021, now Pat. No. 11,624,462, which is a continuation of application No. 16/991,110, filed on Aug. 12, 2020, now Pat. No. 11,022,243, which is a (Continued)

(51) Int. Cl.
| | |
|---|---|
| *F16L 25/12* | (2006.01) |
| *F16L 17/04* | (2006.01) |
| *F16L 21/06* | (2006.01) |
| *F16L 55/17* | (2006.01) |
| *F16L 59/02* | (2006.01) |

(52) U.S. Cl.
CPC ............ *F16L 25/12* (2013.01); *F16L 21/06* (2013.01); *F16L 59/024* (2013.01); *F16L 17/04* (2013.01); *F16L 55/17* (2013.01); *Y10T 29/49826* (2015.01)

(58) Field of Classification Search
CPC . F16L 21/06; F16L 25/12; F16L 17/04; F16L 59/024; F16L 55/17
See application file for complete search history.

(56) References Cited

U.S. PATENT DOCUMENTS 3,229,998 A    1/1966  Pennington
3,425,456 A *  2/1969  Schibig ................. F16L 59/024
(Continued)

FOREIGN PATENT DOCUMENTS

| JP | 2009264397 | 11/2009 |
|---|---|---|
| KR | 101148937 | 5/2012 |
| WO | 2008119112 | 10/2008 |

OTHER PUBLICATIONS

JP 2009264397 A—Machine Translation—English (Year: 2009).*

(Continued)

*Primary Examiner* — William S. Choi
(74) *Attorney, Agent, or Firm* — Fitch, Even, Tabin & Flannery LLP

(57) ABSTRACT

A pipe coupling for coupling a first pipe to a second pipe wherein a gap exists between a first pipe end and a second pipe end. The pipe coupling includes a tubular insert configured to fit within the gap and match an inside diameter and outside diameter of the pipes, thereby providing a through-butt joint between the insert and the pipes. The pipe coupling also includes a half-tubular first fitting section and a half-tubular second fitting section, configured to snap-lock and form a tubular shape over the insert, the first pipe end and the second pipe end. In some embodiments, the insert is integral with the fitting sections.

9 Claims, 8 Drawing Sheets

Related U.S. Application Data continuation of application No. 14/837,808, filed on Aug. 27, 2015, now Pat. No. 10,774,964.

(56) References Cited

U.S. PATENT DOCUMENTS

| | | | |
|---|---|---|---|
| 3,771,820 A | 11/1973 | Hosssr | |
| 4,109,944 A | 8/1978 | Curtin | |
| 4,260,181 A | 4/1981 | Curtin | |
| 4,927,184 A | 5/1990 | Bourjot | |
| 5,007,666 A | 4/1991 | Kyfes | |
| 5,358,283 A | 10/1994 | Silva | |
| 5,443,096 A | 8/1995 | King | |
| 5,462,312 A | 10/1995 | Carpenter | |
| 5,823,581 A * | 10/1998 | Coppolo | F16L 25/12 |
| 7,416,227 B1 | 8/2008 | Earnest | |
| 7,464,971 B2 | 12/2008 | Bennett | |
| 9,371,768 B2 | 6/2016 | Yamanari | |
| 10,774,964 B2 | 9/2020 | Ryan | |
| 11,022,243 B2 | 6/2021 | Ryan | |
| 11,624,462 B2 | 4/2023 | Ryan | |
| 12,031,648 B2 | 7/2024 | Ryan | |
| 2002/0033604 A1 | 3/2002 | Minemyer | |
| 2002/0096881 A1* | 7/2002 | DeSanto, Sr. | |
| 2002/0100540 A1 | 8/2002 | Savitski | |
| 2006/0038397 A1 | 2/2006 | Barrera | |
| 2006/0213572 A1 | 9/2006 | Beaulieu | |
| 2006/0284413 A1 | 12/2006 | Barrera | |
| 2009/0218811 A1 | 9/2009 | Frimel | |
| 2010/0045032 A1 | 2/2010 | Rea | |
| 2010/0117360 A1 | 5/2010 | Chan | |
| 2017/0059078 A1 | 3/2017 | Ryan | |
| 2020/0370689 A1 | 11/2020 | Ryan | |
| 2021/0262598 A1 | 8/2021 | Ryan | |
| 2023/0235838 A1 | 7/2023 | Ryan | |

OTHER PUBLICATIONS

First Examination Report for Australia Patent Application No. 2016313437 mailed from the IP Australia on Nov. 24, 2020.
First Examination Report for India Patent Application No. 201837003311, with English translation, mailed from the Intellectual Property India on Sep. 28, 2020; 5 pages.
First Examination Report for United Kingdom Patent Application No. GB1801385.4 mailed from the Intellectual Property Office on Sep. 18, 2020; 3 pages.
First Examination Report for United Kingdom Patent Application No. GB2109842.1 mailed from the Intellectual Property Office on Sep. 8, 2021.
First Patent Examination Report for New Zealand Patent Application No. 739491 issued by the New Zealand Intellectual Property Office on Apr. 4, 2023.
PCT; International Search Report and Written Opinion of the International Searching Authority for PCT/US2016/47797 mailed Nov. 22, 2016.
Requisition by Examiner for Canadian Patent Application No. 2,994,305 issued by the Canadian Patent Office on May 5, 2023.
Requisition by Examiner for Canadian Patent Application No. 2,994,305 issued by the Canadian Patent Office on Oct. 4, 2022.
Ryan; U.S. Appl. No. 14/837,808, filed Aug. 27, 2015.
Ryan; U.S. Appl. No. 18/191,335, filed Mar. 28, 2023.
Ryan; U.S. Appl. No. 16/991,110, filed Aug. 12, 2020.
Ryan; U.S. Appl. No. 17/318,856, filed May 12, 2021.
Search Report under Section 17 for United Kingdom Patent Application No. GB2109842.1 mailed from the Intellectual Property Office on Sep. 7, 2021.
Second Examination Report for United Kingdom Patent Application No. GB1801385.4 mailed from the Intellectual Property Office on Apr. 20, 2021.
Second Examination Report for United Kingdom Patent Application No. GB2109842.1 mailed from the Intellectual Property Office on Oct. 1, 2021.
USPTO; Advisory Action issued in U.S. Appl. No. 14/837,808 mailed Jan. 10, 2020.
USPTO; Final Office Action Issued in U.S. Appl. No. 14/837,808 mailed Oct. 23, 2019.
USPTO; Non-Final Office Action issued in U.S. Appl. No. 14/837,808 mailed Mar. 10, 2020.
USPTO; Non-Final Office Action issued in U.S. Appl. No. 14/837,808 mailed May 8, 2019.
USPTO; Non-final office action issued in U.S. Appl. No. 16/991,110 mailed Oct. 1, 2020.
USPTO; Non-Final Office Action issued in U.S. Appl. No. 17/318,856 mailed Aug. 16, 2022.
USPTO; Non-Final Office Action issued in U.S. Appl. No. 18/191,335 mailed Oct. 10, 2023.
USPTO; Notice of Allowance issued in U.S. Appl. No. 17/318,856 mailed Dec. 6, 2022.
USPTO; Notice of Allowance issued in U.S. Appl. No. 14/837,808 mailed Jul. 1, 2020.
USPTO; Notice of Allowance issued in U.S. Appl. No. 16/991,110 mailed Feb. 2, 2021.
USPTO; Notice of Allowance issued in U.S. Appl. No. 18/191,335 mailed Feb. 28, 2024.
USPTO; Restriction Requirement issued in U.S. Appl. No. 14/837,808 mailed Feb. 19, 2019.
USPTO; Supplemental Notice of Allowability issued in U.S. Appl. No. 16/991,110 mailed Apr. 29, 2021.

* cited by examiner

PIPE COUPLING

This application is a continuation of U.S. application Ser. No. 18/191,335, filed Mar. 28, 2023, for PIPE COUPLING, which is a continuation of U.S. application Ser. No. 17/318,856, filed May 12, 2021, for PIPE COUPLING, now U.S. Pat. No. 11,624,462, which is a continuation of U.S. application Ser. No. 16/991,110, filed Aug. 12, 2020, for PIPE COUPLING, now U.S. Pat. No. 11,022,243, which is a continuation of U.S. application Ser. No. 14/837,808, filed Aug. 27, 2015, now U.S. Pat. No. 10,774,964, for PIPE COUPLING, all of which are incorporated in their entirety herein by reference.

BACKGROUND OF THE INVENTION

1. Field of the Invention

The present invention relates generally to pipe couplings, and more specifically to split-sleeve pipe couplings.

2. Discussion of the Related Art

Pipes are widely used for transporting liquids for various fluid-based systems, for example, water supply, irrigation, and wastewater systems. Pipes may be of various materials (e.g. copper, cast iron, PVC or ABS), and can be flexible or rigid.

Pipe couplings are widely known in the art to connect two pieces of piping together. In one standard embodiment, two adjacent pipe ends are butted together and a tubular exterior sleeve is slid over the butt joint. The end of the new pipe section is then slid inside the exterior sleeve until abutting the existing pipe. Adhesive is typically used in conjunction with the sleeve to provide a watertight seal.

With some types of piping, such as sewer piping and other gravity piping, any coupling or transition should maintain the inner surface profile of the pipe in order to prevent disruption of the flow due to changes in the inner profile of the pipe. Additionally, codes such as the Uniform Plumbing Code have other requirements such as requiring that fittings or couplings fit entirely into the pipe socket when using an adhesive or glue, and prohibiting fittings or connections that obstruct the flow.

When replacing a section of piping, a watertight joint must be made with the existing pipe at each end of the new pipe section. Often, the existing piping is unmovable and of rigid composition. While a sleeve coupling may often be used on a first end of the new pipe section, after the sleeve coupling is installed on the first end, the second end of the new pipe section will be abutting the existing pipe end, preventing installation of the second pipe coupling. Therefore, a pipe coupling is needed that can provide the required watertight coupling of the butt joint without moving the pipe sections, and while maintaining the inner profile of the pipe.

SUMMARY OF THE INVENTION

Several embodiments of the invention advantageously address the needs above as well as other needs by providing a coupling for coupling a first pipe with a second pipe, the first pipe and the second pipe each having a pipe inside diameter of a pipe interior surface and a pipe outside diameter of a pipe exterior surface, wherein a gap exists between a first pipe end and a second pipe end, comprising: a tubular insert with an insert inside diameter of an insert interior surface matching the pipe inside diameter, and an insert outside diameter of an insert exterior surface matching the pipe outside diameter, the tubular insert having a longitudinal length approximately equal to the gap, whereby the insert fits within the gap and generally abuts the first pipe end and the second pipe end: a first fitting section in a generally half-tubular shape and having a longitudinal section length: a second fitting section in a generally half-tubular shape and having the longitudinal section length, wherein the first fitting section and the second fitting section are configured to couple together to form a tubular section having an inside diameter generally equal to the pipe outside diameter, wherein the longitudinal length is greater than the gap, whereby the first pipe is coupled to the second pipe by fitting the insert within the gap such that the insert exterior surface aligns with the first pipe exterior surface and the second pipe exterior surface, and the first fitting section and the second fitting section are coupled together over the insert, whereby the insert, the first pipe end, and the second pipe end are enveloped by the tubular section formed by coupling the first fitting section to the second fitting section.

In another embodiment, the invention can be characterized as a coupling for coupling a first pipe with a second pipe, the first pipe and the second pipe each having a pipe inside diameter of a pipe interior surface and a pipe outside diameter of a pipe exterior surface, wherein a gap exists between a first pipe end and a second pipe end, comprising: a first fitting section in a generally half-tubular shape and having a longitudinal section length, a wall thickness and an outside diameter, the first fitting section including a middle portion with a middle portion thickness greater than the wall thickness, the middle portion thickness having a middle portion inside diameter generally matching the pipe inside diameter; and a second fitting section of generally the same shape as the first fitting section, and configured to couple to the first fitting section to form a tubular section, wherein the longitudinal section length is greater than the gap, whereby the first fitting section and the second fitting section are coupled together over the first pipe and the second pipe, whereby the middle portions fit within the gap and the first pipe and the second pipe end are enveloped by the tubular section formed by coupling the first fitting section to the second fitting section.

In a further embodiment, the invention may be characterized as a method for coupling a first pipe with a second pipe, the first pipe and the second pipe each having a pipe inside diameter and a pipe outside diameter, wherein a gap exists between a first pipe end and a second pipe end, comprising: fitting a tubular insert within the gap, wherein an insert inside diameter of an insert inside surface matches the pipe inside diameter, and an insert outside diameter of the insert outside surface matching the pipe outside diameter, the tubular insert having a length approximately equal to the gap; and coupling a first fitting section to a second fitting section, wherein the first fitting section and the second fitting section are generally half-tubular shapes and configured to form a tubular shape when coupled together, wherein the coupling of the first fitting section to the second fitting section envelops the tubular insert, the first pipe end and the second pipe end, and whereby the first pipe is coupled to the second pipe.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
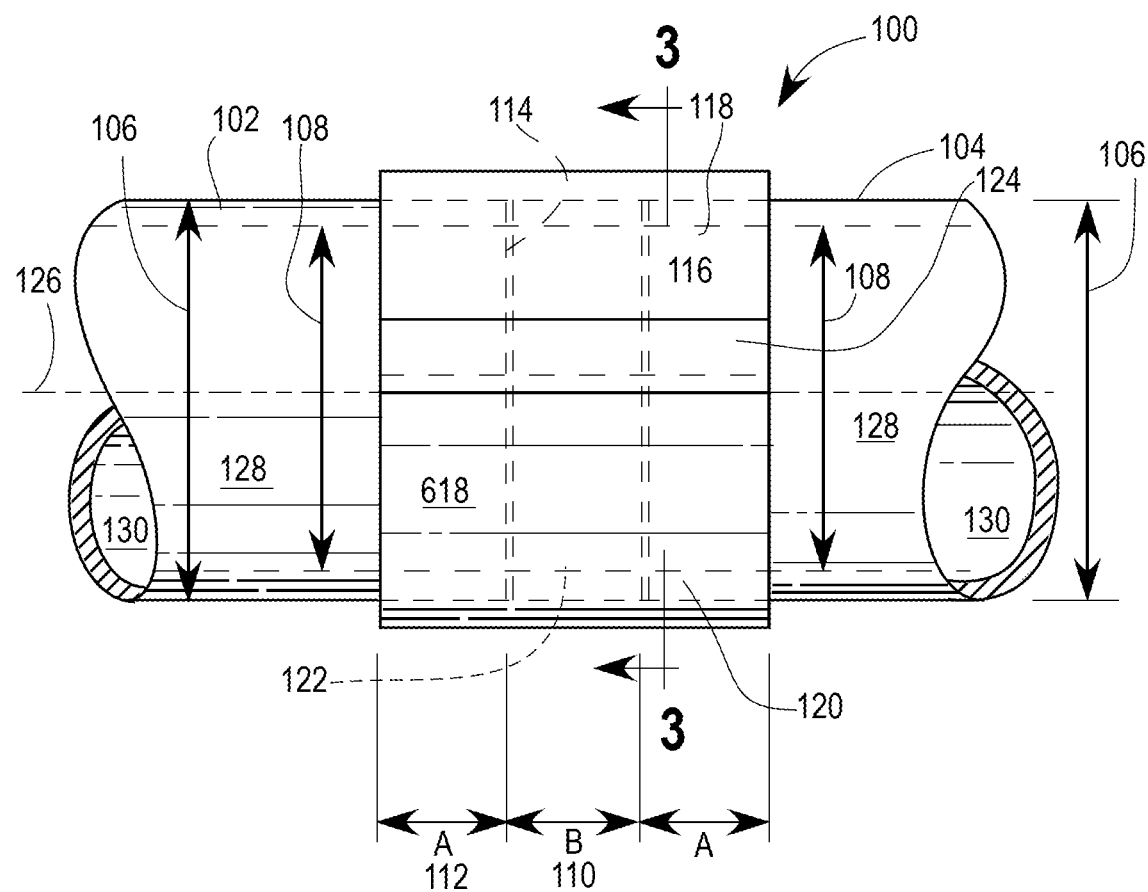
FIG. 1 is a front elevational view of the pipe coupling as installed in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
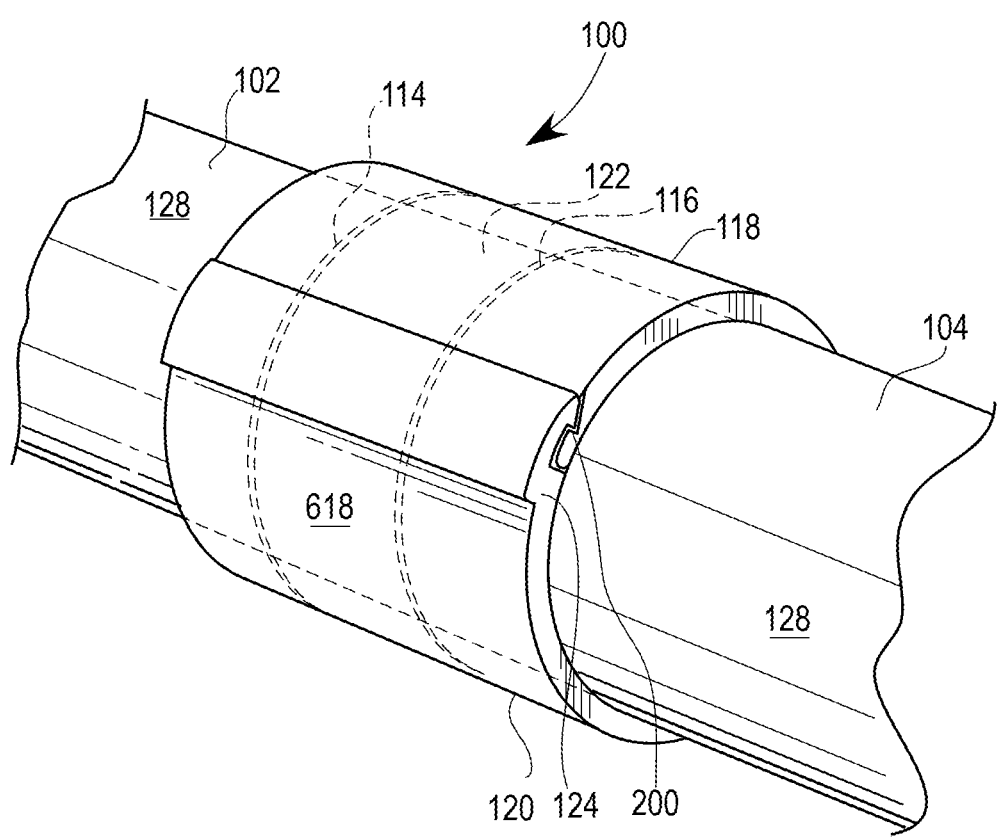
FIG. 2 is a front perspective view of the pipe coupling as installed.

Referring first to FIGS. 1 and 2, a front elevation and a front perspective view of the pipe coupling 100, as installed, are shown in one embodiment of the present invention. Shown are a first pipe 102, a second pipe 104, a pipe outside diameter 106, a pipe inside diameter 108, a gap 110, an overlap 112, a first pipe end 114, a second pipe end 116, a first fitting section 118, a second fitting section 120, an insert 122, and a locking flange 124, a longitudinal axis 126, a pipe exterior surface 128, a pipe interior surface 130, a receiving notch 200, and an exterior surface 618.

The tubular first pipe 102 and the tubular second pipe 104 represent existing pipe sections to be joined. The first pipe 102 and second pipe 104 each have the outside diameter 106 (indicated by O.D.) and the inside diameter 108 (indicated by I.D.). The first pipe 102 and the second pipe 104 also have the pipe interior surface 130 and the pipe exterior surface 128. Typically, the first pipe 102 and the second pipe 104 have the same outside diameter 106 and the same inside diameter 108. It will be apparent to those of ordinary skill in the art that the typical application of the pipe coupling 100 will be for joining sections of the same inside and outside diameter, but the pipe coupling 100 may be altered to accommodate different pipe sizes. As shown in FIGS. 1 and 2, the first pipe 102 and the second pipe 104 share the longitudinal axis 126.

The gap 110 between the first pipe end 114 and the second pipe end 116 is designated by the dimension 'B'. The gap 110 dimension may vary but typically corresponds to a gap resulting from one of the pipe ends corresponding to a replacement section of pipe where the distal end of the pipe is installed using a standard sleeve pipe fitting. For pipe sections that are rigid and unmovable, inserting the pipe end into the sleeve fitting requires a new pipe section length smaller than the total length to be spanned by the new pipe section. The resulting gap 110 dimension can be determined by using the pipe dimensions and the size of the sleeve. It will be understood that the gap 110 B may vary, depending, for example, on the pipe diameter, or on whether the gap 110 is from installation of the distal end of a replacement section, or is the result of taking out a small width of existing pipe.

The first pipe 102 and the second pipe 104 typically comprise the same material, for example, PVC, CPVC, or ABS. In some embodiments, the first pipe 102 and the second pipe 104 are Schedule 40, Schedule 80, or SDR 35.

The pipe coupling 100 comprises the first fitting section 118, the second fitting section 120, and the insert 122. In the embodiment shown, the first fitting section 118 and the second fitting section 120 are essentially the same shape. The first fitting section 118 and the second fitting section 120 are typically of the same material as the first pipe 102 and the second pipe 104. Additionally, the first fitting section 118 and the second fitting section 120 are of a material resiliently flexible enough to allow for the snap-lock joints coupling the first fitting section 118 to the second fitting section 120. For example, the first fitting section 118 and the second fitting section 120 may comprise PVC, CPVC or ABS. It will be understood that for other methods of coupling the first fitting section 118 to the second fitting section 120, for example a screw-type connecting, the fitting sections may comprise a more rigid material. The insert 122 may be the same material as the first pipe 102 and the second pipe 104, the same material as the first fitting section 118 and the second fitting section 120, or a different material suitable for conveyance of a specific liquid and/or for forming waterproof joints between the insert 122, the first pipe 102 and the second pipe 104.

For clarity, only the first fitting section 118 will be described, as it will be understood that the first fitting section 118 description applies equally to the second fitting section 120.

Figure 6:
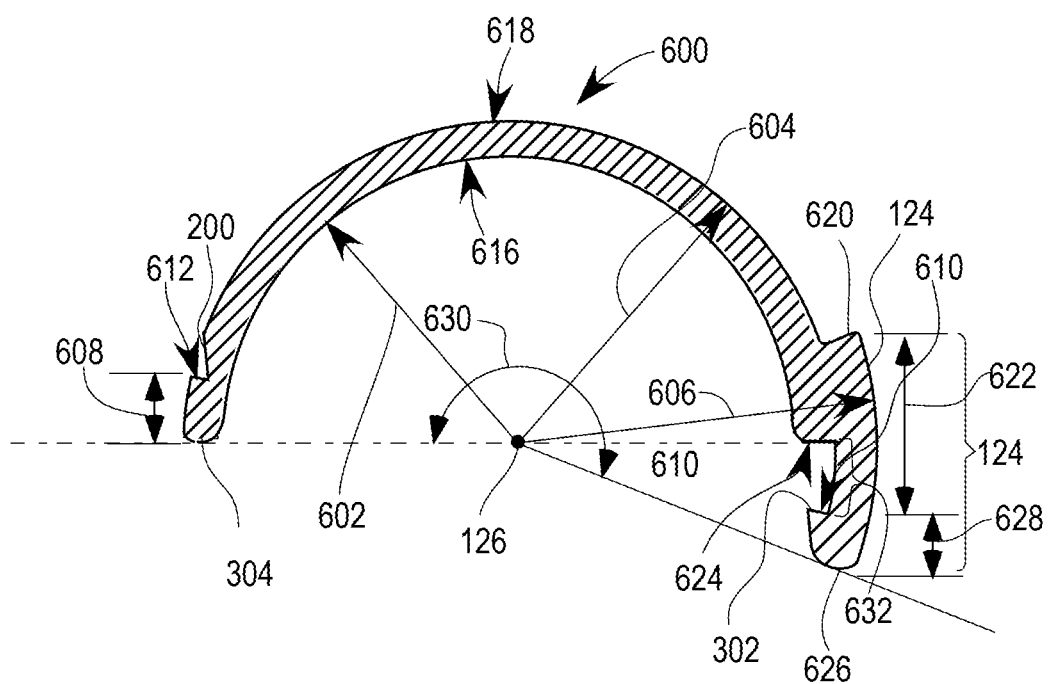
FIG. 6 is a transverse cross-sectional view of a fitting section of the pipe coupling.

The first fitting section 118 is a generally half-tubular shape, i.e. a tube section cut in half longitudinally. The first fitting section 118 has an inside diameter generally equal to the O.D. of the pipe sections. An angle between the receiving end and the locking flange end (as shown in FIG. 6) is greater than 180 degrees, such that when the first fitting section 118 and the second fitting section 120 and are placed over the pipes, the locking flange 124 of each fitting section overlaps and snap-locks with the receiving end of the other section, forming a tubular shape with an inside diameter generally equal to the pipe outside diameter 106.

In the embodiment shown, the first fitting section 118 and the second fitting section 120 each have a longitudinal length A+B+A, where B is the gap 110 dimension as previously described, and A is a the overlap 112 dimension on each side of the gap 110 dimension. In some embodiments, the overlap 112 dimension may be different on each side of the gap 110.

In some embodiments, the overlap 112 dimension A is a standard pipe fitting overlap dimension based on at least one of the pipe material, thickness, and diameter.

Figure 4:
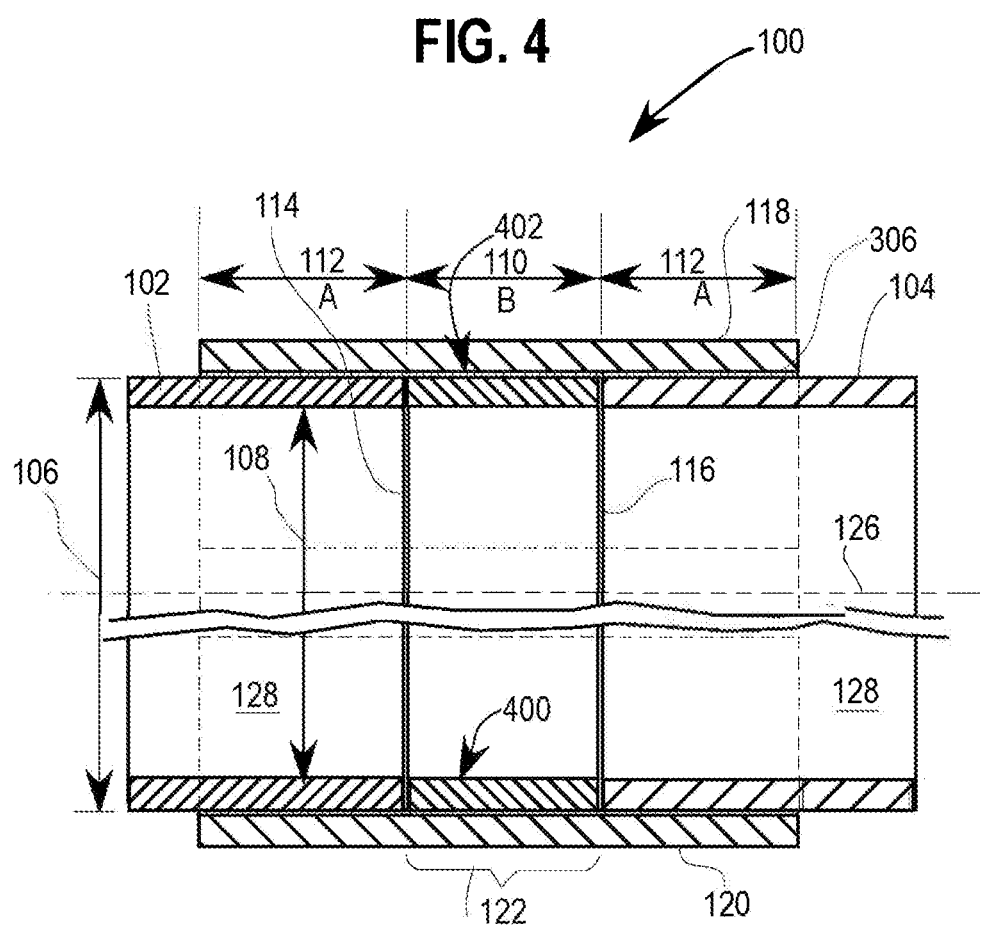
FIG. 4 is a longitudinal cross-sectional view of the pipe coupling as installed.

The insert 122 is a tubular shape with an insert outside diameter matching the pipe outside diameter 106 and an insert inside diameter matching the pipe inside diameter 108. The insert also has an insert interior surface 400 and an insert exterior surface 402 (as shown in FIG. 4). A length of the insert 122 is approximately equal to, or slightly smaller than the gap 110, such that the insert 122 may be inserted into the gap 110, generally abutting the first pipe end 114 and the second pipe end 116.

It will be understood by those of ordinary skill in the art that in lieu of the separate insert 122, the pipe coupling may be comprised of two fitting sections 118, 120 with an integral middle portion 702 forming the interior shape of the insert 122, as shown below in FIG. 7. The following descriptions of the pipe coupling 100 with the separate insert 122 apply equally to the integral embodiment shown in FIG. 7.

In operation, the first pipe 102 and second pipe 104 are existing, with the gap 110 B between the first pipe end 114 and the second pipe end 116. The insert 122 is placed between the first pipe 102 and the second pipe 104, with an insert longitudinal axis aligning with the pipe longitudinal axis 126. A waterproof adhesive is applied between the first pipe end 114 and the insert 122 and the second pipe end 116 and the insert 122. The waterproof adhesive provides a waterproof seal between the insert and the first pipe end, and between the insert and the second pipe end.

The waterproof adhesive is applied to the exterior of the first and second pipe 104 for an approximate distance of A from each pipe end. The waterproof adhesive is also applied to the exterior of the insert 122. The first fitting section 118 is placed around the first pipe 102, the second pipe 104, and the insert 122 such that the first fitting section 118 is generally centered on the insert 122, as shown in FIG. 1. The second fitting section 120 is then coupled to the first fitting section 118, forming a tubular section and enveloping the first pipe end, the second pipe end, and entire insert. In the preferred embodiment, the coupling is a snap-lock type coupling, as described further below.

When it is necessary to replace a section of pipe using butt joints that are glued all the way into the pipe cavity, and when the original pipe sections are rigid and non-movable, conventional sleeve fittings cannot be used on both ends of the replacement pipe. Additionally, when a sleeve fitting is used on one end of the replacement section, the replacement section must be shorter than the total replacement length so that replacement section can be aligned with the existing pipe ends, then slid into the fitting. The sliding of the fitting into the sleeve creates the gap 110 at the other end. The present invention provides the code-compliant butt joint while accommodating the gap 110 caused by the connection on the other end. Pipe replacement using the pipe coupling 100 is shown further below in FIGS. 8-11. Additionally, the present invention maintains the inner diameter of the existing pipe, as the insert 122 is chosen to include an inside diameter to match the existing pipe. This is important for pipes such as sewage pipes, which require a smooth, generally continuous, inner surface to avoid blockage and comply with code requirements, such as UPC 316.4.1, which prohibits fittings or couplings with an enlargement, chamber, or recess with a ledge, shoulder, or reduction of pipe area that offers a reduction to flow through the drain. The fitting may be used for any compatible piping, for example, plumbing drains, vent pipes, sewer lines, and electrical conduits.

Figure 3:
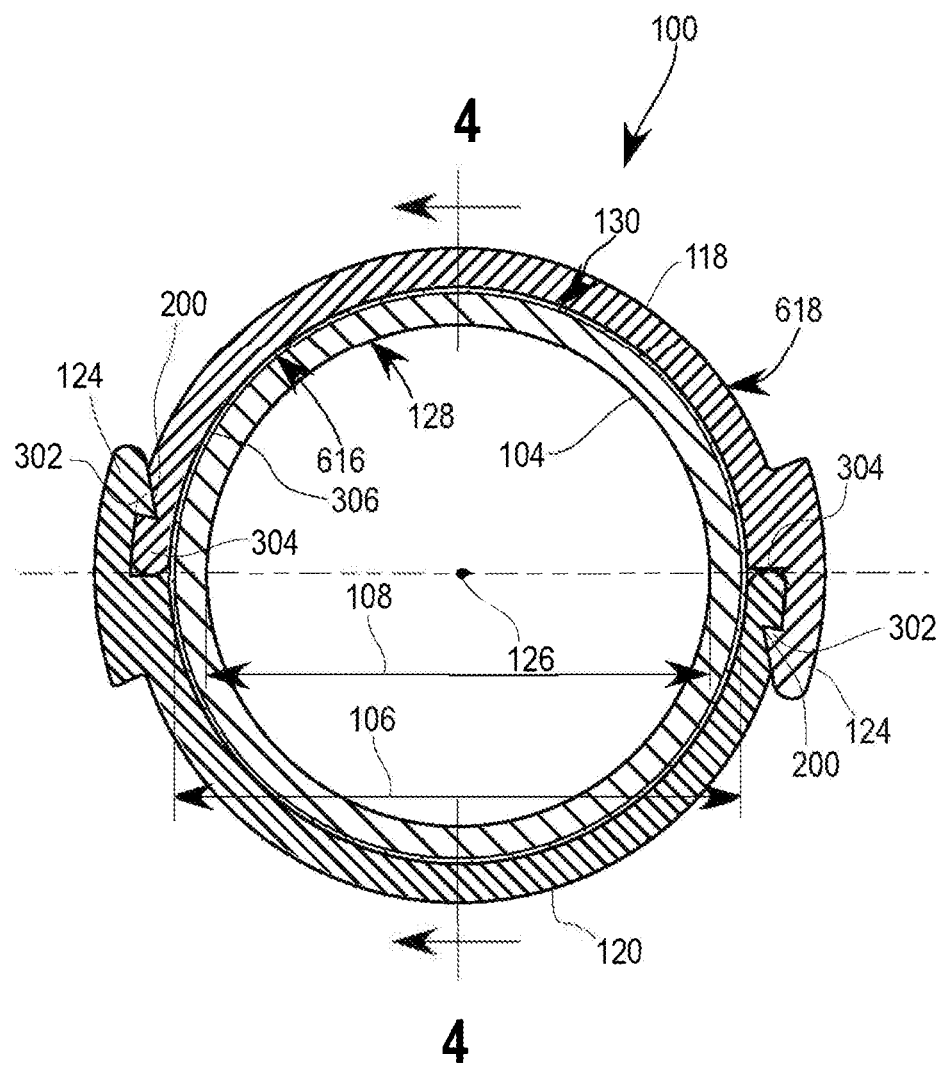
FIG. 3 is a transverse cross-sectional view of the pipe coupling as installed.

Referring next to FIG. 3, a transverse cross-sectional view of the pipe coupling 100 installed on the first pipe 102 and the second pipe 104 is shown. Shown are the second pipe 104, the pipe outside diameter 106, the pipe inside diameter 108, the first fitting section 118, the second fitting section 120, the plurality of locking flanges 124, the plurality of notches 200, a plurality of teeth 302, a plurality of receiving ends 304, the pipe interior surface 128, the pipe exterior surface 130, and a waterproof adhesive 306.

As previously described, the first fitting section 118 and the second fitting section 120 are coupled together over the insert 122 and the first pipe 102 and the second pipe 104 to form the exterior pipe coupling 100. As shown in FIG. 3, the first fitting and the second fitting each include the locking flange 124 at one longitudinal end (the locking flange end) and the notch 200 at the opposite longitudinal end (the receiving end 304). The locking flange 124 includes the tooth 302 on the interior surface 616 of the fitting section. The receiving end 304 includes the notch 200 on the exterior surface 618 of the fitting. In operation, the locking flange 124 flexes outward enough for the tooth 302 of the first fitting section 118 to pass a portion of the receiving end 304 of the second fitting section 120 and be received in the notch 200 of the second fitting section 120, forming the snap-lock coupling of the locking flange end to the receiving end 304. The locking flange end of the second fitting section 120 is coupled to the receiving end 304 of the first fitting section 118 in the same way. The shape of the fitting section is described in more detail in FIG. 6. As previously mentioned, the coupling 100 may also be formed with the insert 122 integral to the fitting sections 118, 120 as shown in FIG. 7.

Referring next to FIG. 4, a longitudinal cross-sectional view of the pipe coupling 100 installed on the first pipe 102 and the second pipe 104 is shown. Shown are the first pipe 102, the second pipe 104, the pipe outside diameter 106, the pipe inside diameter 108, the gap 110, the plurality of overlaps 112, the first pipe end 114, the second pipe end 116, the first fitting section 118, the second fitting section 120, the insert 122, the pipe interior surface 128, the insert interior surface 400, the insert exterior surface 402, and the waterproof adhesive 306.

As shown in FIG. 4, the pipe coupling 100 is configured such that the insert 122 nominally matches the gap 110 B between the first pipe end 114 and the second pipe end 116.

It will be understood by those of ordinary skill in the art that the insert 122 will be slightly shorter than the gap 110 to allow for construction tolerances and gluing. In some embodiments the insert 122 is ⅟₁₆"-⅛" shorter than the gap. As previously described, the insert inside diameter is generally the same as the inside diameter 108 of the first pipe 102 and the second pipe 104, to provide a generally constant inner surface.

Figure 7:
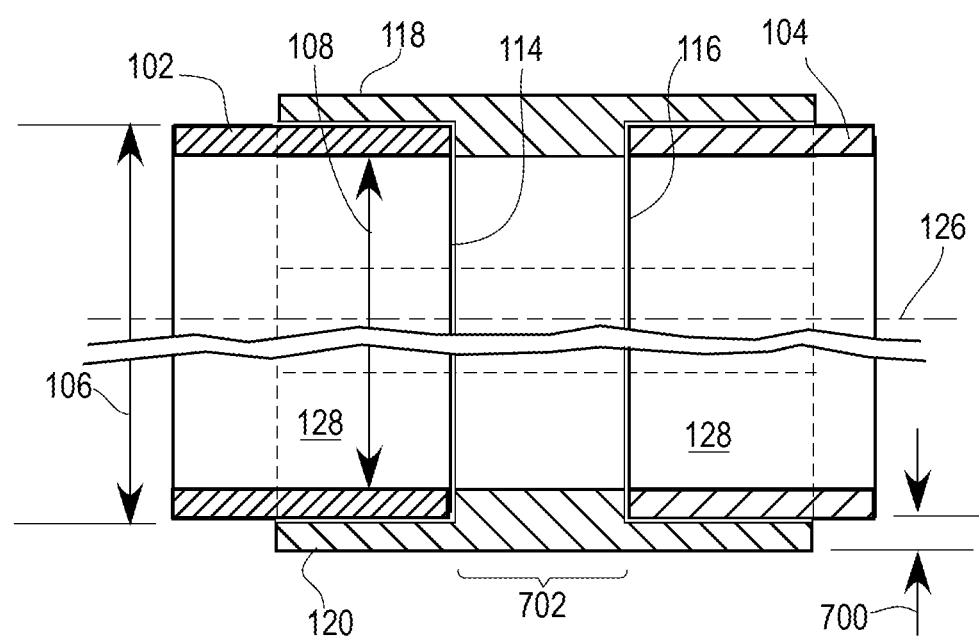
FIG. 7 is a longitudinal cross-sectional view of the pipe coupling as installed, in another embodiment of the present invention.

As previously mentioned, the coupling 100 may also be formed with the insert 122 integral to the fitting sections 118, 120 as shown in FIG. 7.

Figure 5:
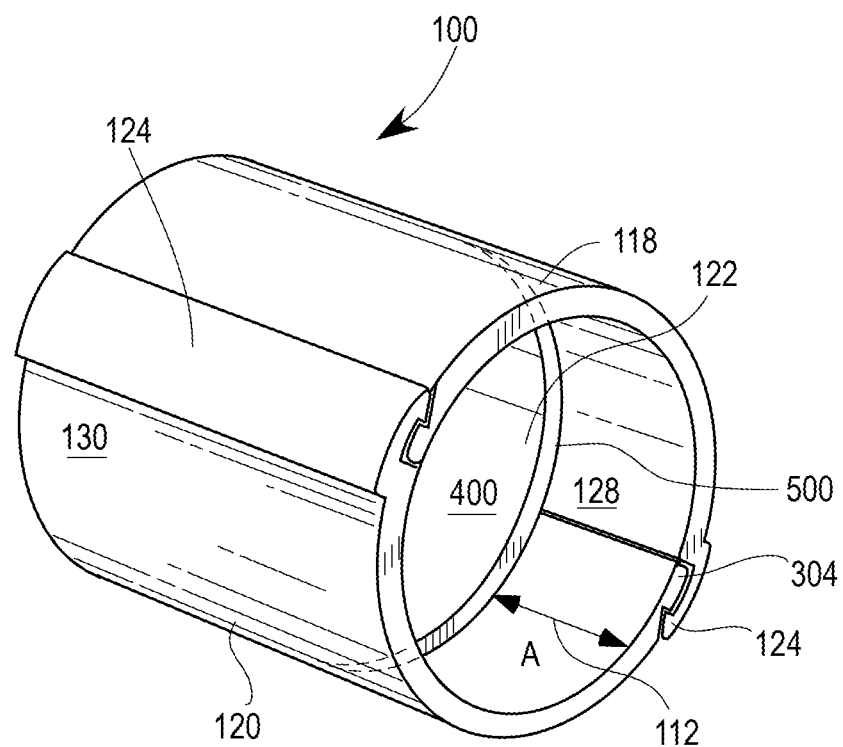
FIG. 5 is a front perspective view of the pipe coupling.

Referring next to FIG. 5, a front perspective view of the pipe coupling 100 is shown. Shown are the overlap 112, first fitting section 118, the second fitting section 120, the insert 122, the plurality of locking flanges 124, the pipe interior surface 128, the pipe exterior surface 130, the plurality of receiving ends 304, the insert interior surface 402, and an insert end surface 500.

As shown in FIG. 5, the insert 122 is located inside the first fitting section 118 and the second fitting section 120 such that each end of the insert 122 is approximately the overlap 112 dimension A from the proximate end of the tubular section.

Referring next to FIG. 6, a cross-sectional view of an exemplary fitting section 600 is shown in one embodiment of the invention. Shown are the locking flange 124, the notch 200, the tooth 302, the receiving end 304, a fitting inside radius 602, a fitting outside radius 604, a fitting flange radius 606, a receiving end distance 608, a first locking face 610, a second locking face 612, the triangular notch 200, an interior surface 616, an exterior surface 618, a flange shoulder 620, a shoulder distance 622, a third locking face 624, a locking flange end 626, and a locking flange end distance 628, the angle 630, and a locking flange notch 632.

As previously described, the first fitting section 118 and the second fitting section 120 are the same shape, herein described as the exemplary fitting section of FIG. 6.

As previously described, the fitting section 600 is the generally half-tubular shape. The fitting section 600 has the inside radius 602 and the outside radius 604, with respect to the center 126 of the fitting section 600. The center 126 of the fitting section 600 corresponds to the pipe longitudinal axis 126. The fitting section ends parallel to the longitudinal axis 126 are the receiving end 304 and the locking flange end. The angle between the receiving end 304 and the locking flange end is greater than 180 degrees. A thickness of the fitting section 600 is generally equal to the difference between the inside radius 602 and the outside radius 604.

The receiving end 304 of the fitting section 600 may be rounded. The receiving end 304 includes the triangular notch 200 on the exterior surface 618 of the fitting section 600. The notch 200 includes the second locking face 612, which is generally perpendicular to the exterior surface 618. The second locking face 612 has a depth, which in the embodiment shown is not more than 50% of the thickness of the fitting section 600. The second locking face 612 is proximate to the receiving end 304. The notch 200 is formed by linearly sloping up from the bottom of the second locking face 612 to the exterior surface 618 of the fitting section 600 in a direction away from the receiving end 304. In one embodiment, the distance from the receiving end 304 to the second locking face 612 is approximately ⁷⁄₁₆". The depth of the second locking face is ⅛", and a width of the notch 200 along the exterior surface 618 is approximately ½".

At the opposite end, the locking flange end 626, at approximately 180 degrees from the receiving end 304 the fitting section 600 is jogged outward, forming the third locking face 624 approximately perpendicular to the interior surface 616 of the fitting section 600, and the flange shoulder on the exterior surface 618. The location of the third locking face 624 is configured to receive the receiving end 304 when two sections are locked together. The third locking face 624 depth approximately matches the thickness of the fitting section 600. The outwardly jogged portion forms the locking flange notch 632 in the locking flange 124. The locking flange notch 632 terminates in the tooth 302 comprising the first locking face 610. The locking flange end distance 628 between the first locking face 610 and the locking flange end 626 is slightly smaller than the receiving end distance 608, so that the tooth 302 may be received by the triangular notch 200 of the other fitting section 600.

The locking flange end 626 includes the fitting flange radius 606 that is greater than the outside diameter of the fitting section 600. The fitting flange radius 606 allows for the fitting section 600 to maintain enough thickness when the fitting section 600 is jogged outward to form the locking flange notch 632. The extent of the fitting section 600 having the fitting flange radius 606 is from the locking flange end 626 to the flange shoulder 620, which is equal to the locking flange end distance 628 plus the shoulder distance 622. In the embodiment shown, the extent of the fitting flange radius 606 is 1.75".

The cross-sectional shape of the fitting section 600 is generally the same for the entire longitudinal length of the fitting section 600.

As previously mentioned, the fitting section 600 may also be formed with the insert 122 integral with the fitting section 600 as shown in FIG. 7.

Referring next to FIG. 7, a cross-sectional view of the pipe coupling 100 installed on the pipe is shown in a direction parallel to the longitudinal axis 126, in another embodiment of the present invention. Shown are the first pipe 102, the second pipe 104, the pipe outside diameter 106, the pipe inside diameter 108, the gap 110, the overlap 112, the first pipe end 114, the second pipe end 116, the first fitting section 118, the second fitting section 120, the longitudinal axis 126, the pipe interior surface 128, the pipe exterior surface 130, a wall thickness 700, and a middle portion 702.

In another embodiment of the present invention, the insert 122 may be formed as an integral part of the first fitting section 118 and the second fitting section 120, as shown in FIG. 7. Each fitting section is formed, for example by injection molding, with the additional thickness of the insert 122 included in the fitting section shape. The integral design has the advantage of not requiring the insert 122 to be held in place while the butt joints are glued, and eliminating the joint on the exterior of the insert 122. A horizontal glued joint would be formed between the insert portions at the snap-lock location.

Referring next to FIGS. 8-11, longitudinal cross-sectional views of an existing pipe with a replacement segment are shown in various stages of repair. Shown are the first pipe 102, the second pipe 104, the pipe coupling 100, the gap 110, a third pipe 800, a pipe distance 802 and a standard pipe coupling 900.

Figure 8:
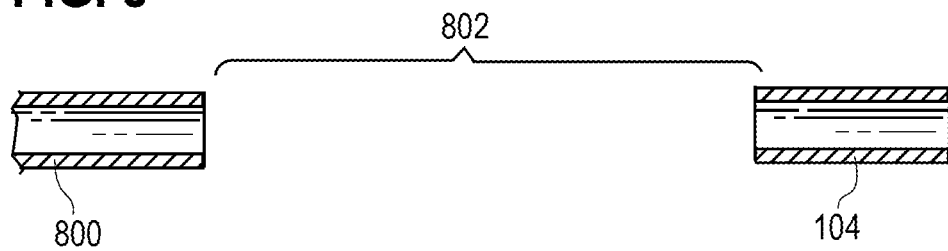
FIG. 8 is a longitudinal cross-sectional view of existing pipe segments in a first stage of repair.

In a first stage shown in FIG. 8, the second pipe 104 on the left and the third pipe 800 on the right are shown as existing portions of a pipeline to be joined. The second pipe 104 and the third pipe 800 are separated by the pipe distance 802.

Figure 9:
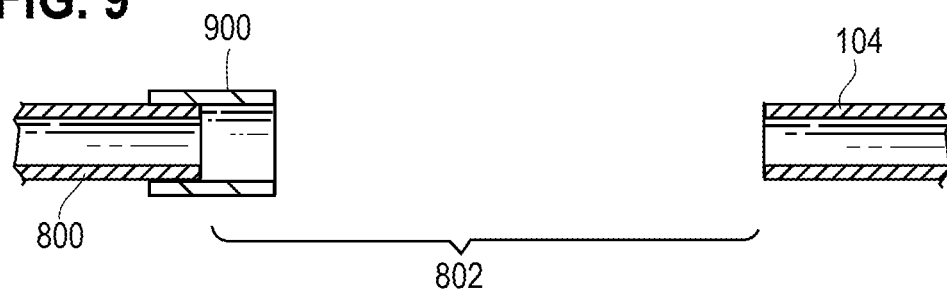
FIG. 9 is a longitudinal cross-sectional view of existing pipe segments in a second stage of repair.

In a second stage shown in FIG. 9, the standard pipe fitting 900 has been coupled to an end of the third pipe 800 proximate to the second pipe 104. If a second pipe fitting were to be applied to an end of the second pipe, it would not be possible to fit another section of pipe in and still maintain the required pipe overlap.

Figure 10:
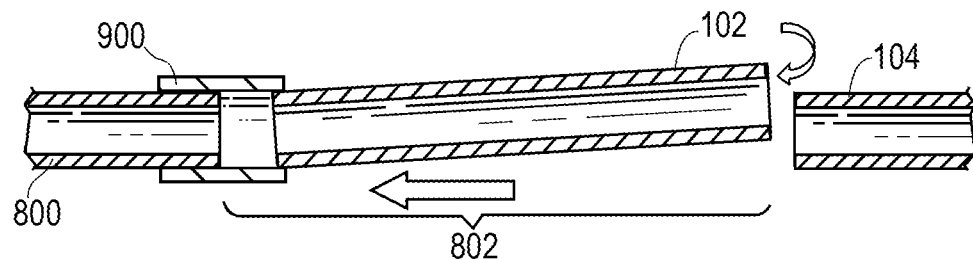
FIG. 10 is a longitudinal cross-sectional view of existing pipe segments in a third stage of repair.

In a third stage shown in FIG. 10, a left end of the first pipe 102, which is the replacement segment of pipe joining the pipeline, is slid into the standard pipe fitting coupled to the third pipe 800. The first pipe 100 may be rotated into place and then slid leftward to form the joint, as shown in FIG. 10.

Figure 11:
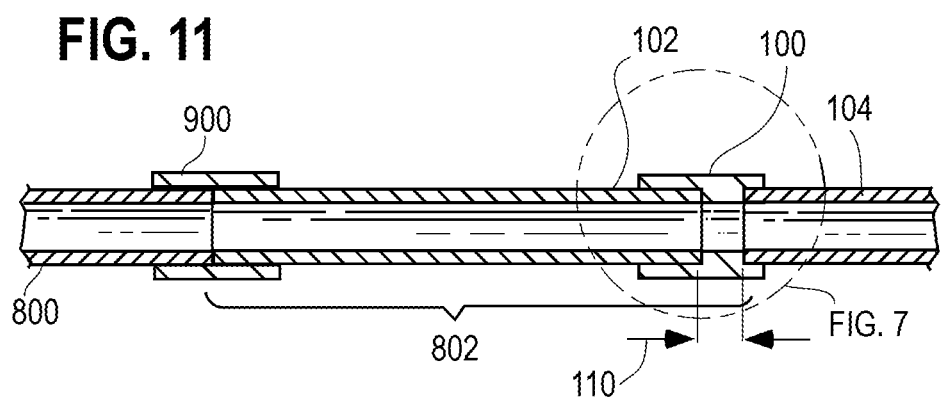
FIG. 11 is a longitudinal cross-sectional view of existing pipe segments in a final stage of repair.

In a final stage shown in FIG. 11, the first pipe 102 has been slid such that an end of the first pipe 102 abuts the end of the third pipe 800, and the longitudinal axes of all pipe portions 102, 104, 800 are aligned. The gap 110 now exists between the first pipe 102 and the second pipe 104, and is spanned by the pipe coupling 100 installed as previously described, whereby the pipeline is joined.

While the invention herein disclosed has been described by means of specific embodiments, examples and applications thereof, numerous modifications and variations could be made thereto by those skilled in the art without departing from the scope of the invention set forth in the claims.

What is claimed is:

1. A device for forming a tubular coupling, comprising:
a fitting section having a longitudinal length and a generally half-tubular cross-section having an outside radius, wherein along the longitudinal length the fitting section comprises a left portion having a left inside radius and a left thickness, a right portion having a right inside radius and a right thickness, and a middle portion interposed between the left portion and the right portion and having a middle inside radius and a middle thickness, the fitting section further comprising:
   a first end of the cross-section having a receiving shape having a length, the receiving shape having an interior surface having the inside radius of the corresponding portion for the entire length of the receiving shape, and an exterior surface including a receiving shape locking face at a receiving distance from a terminus of the first end, wherein the interior surface and the exterior surface define a thickness of the receiving shape, wherein the receiving shape locking face comprises a first portion proximate to the terminus of the first end and a second portion contiguous with the first portion, wherein the second portion has a thickness less than the thickness of the first portion and the thickness of the second portion is at least 50% of the corresponding fitting section thickness; and
   a second end of the cross-section having a locking shape, the locking shape having a portion of an interior surface of the locking shape located outwards of the inside radius of the corresponding portion, thereby forming a notch in the interior surface of the locking shape, the locking flange notch including:
      a distal locking face located at a first distance from a terminus of the second end; and
      a proximate locking face located between the distal locking face and the terminus of the second end, whereby the notch has a width between the proximate locking face and the distal locking face, wherein the width of the notch is nominally equal to the receiving distance of the receiving shape; wherein
   the notch is configured to fit over and couple to a receiving shape of a second fitting section having the same geometry as the fitting section, including the receiving shape locking face of the second fitting section juxtaposed with the proximate locking face and the terminus of the first end of the second fitting section being located within the notch; and wherein
   the receiving shape is configured to receive and couple to a locking shape of the second fitting section including the receiving shape locking face juxtaposed with a proximate locking face of the second fitting section and the terminus of the first end being located within a notch of the second fitting section, whereby coupling of the fitting section to the second fitting section forms the tubular coupling, said tubular coupling having a tubular left portion having a tubular left inside radius, a tubular right portion having a tubular right inside radius, and a tubular middle portion having a tubular middle inside radius.

2. The device for forming the tubular coupling of claim 1, wherein the middle inside radius is smaller than each of the left inside radius and the right inside radius.

3. The device for forming the tubular coupling of claim 2, wherein the left inside radius and the right inside radius are equal.

4. The device for forming the tubular coupling of claim 1, further comprising a waterproof adhesive applied to a portion of an interior surface of the fitting section.

5. The device for forming the tubular coupling of claim 1, wherein the fitting section is a material selected from the group consisting of PVC, CPVC, and ABS.

6. The device for forming the tubular coupling of claim 1, wherein the fitting section is formed by injection molding.

7. The device for forming the tubular coupling of claim 1, the second end further comprising a tooth, wherein the proximate locking face is included in the tooth.

8. The device for forming the tubular coupling of claim 1, wherein the receiving shape is configured to snap-lock couple to the locking shape of the second fitting section and the locking shape is configured to snap-lock couple to the receiving shape of the second fitting section.

9. The device for forming the tubular coupling of claim 1, wherein the locking shape has an exterior surface located outside the outside radius.

\* \* \* \* \*